(12) United States Patent
Uenodan et al.

(10) Patent No.: US 11,112,286 B2
(45) Date of Patent: Sep. 7, 2021

(54) THERMAL FLOWMETER

(71) Applicant: HITACHI AUTOMOTIVE SYSTEMS, LTD., Ibaraki (JP)

(72) Inventors: Akira Uenodan, Hitachinaka (JP); Masashi Fukaya, Tokyo (JP); Tomoaki Saito, Hitachinaka (JP); Shinobu Tashiro, Hitachinaka (JP); Tsubasa Watanabe, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 224 days.

(21) Appl. No.: 16/464,867

(22) PCT Filed: Sep. 27, 2017

(86) PCT No.: PCT/JP2017/034944
§ 371 (c)(1),
(2) Date: May 29, 2019

(87) PCT Pub. No.: WO2018/138967
PCT Pub. Date: Aug. 2, 2018

(65) Prior Publication Data
US 2019/0323871 A1    Oct. 24, 2019

(30) Foreign Application Priority Data

Jan. 26, 2017 (JP) .............................. JP2017-012449

(51) Int. Cl.
*G01F 1/684* (2006.01)
*G01F 5/00* (2006.01)
(Continued)

(52) U.S. Cl.
CPC ............. *G01F 1/684* (2013.01); *F02D 41/18* (2013.01); *G01F 5/00* (2013.01); *G01F 15/04* (2013.01);
(Continued)

(58) Field of Classification Search
CPC ........... G01F 5/00; F02D 41/18; F02D 41/182
See application file for complete search history.

(56) References Cited

U.S. PATENT DOCUMENTS

2003/0019289 A1    1/2003  Ueyama et al.
2011/0036162 A1    2/2011  Holoch et al.
(Continued)

FOREIGN PATENT DOCUMENTS

EP    1 221 593 A1    7/2002
JP    2003-035578 A   2/2003
(Continued)

OTHER PUBLICATIONS

International Search Report dated Jan. 16, 2018 for the PCT International Application No. PCT/JP2017/034944.

*Primary Examiner* — Herbert K Roberts
(74) *Attorney, Agent, or Firm* — Volpe Koenig

(57) ABSTRACT

A thermal flowmeter includes a plurality of measuring units for stabilizing air flowing in a sub-passage, and improves noise performance or a pulsation characteristic of a flow rate sensor. The thermal flowmeter includes a flange fixed to an attachment part of a main passage, a sub-passage takes in a part of measured gas flowing in the main passage, a flow rate measuring unit measures a flow rate of the measured gas in the sub-passage, a circuit component controls the flow rate measuring unit, and the flow rate measuring unit and an electronic component are mounted on a circuit substrate. The sub-passage is formed in a substrate of the circuit substrate, the sub-passage on a surface side of the circuit substrate and a second space on a rear surface side are separated by the circuit substrate, and a pressure measuring unit and the circuit component are arranged in the second space.

15 Claims, 17 Drawing Sheets

(51) Int. Cl.
*F02D 41/18* (2006.01)
*G01F 15/04* (2006.01)
*G01K 13/02* (2021.01)

(52) U.S. Cl.
CPC ...... *G01K 13/02* (2013.01); *F02D 2200/0414* (2013.01)

(56) References Cited

U.S. PATENT DOCUMENTS

| | | |
|---|---|---|
| 2012/0055245 A1 | 3/2012 | Doi et al. |
| 2015/0160058 A1* | 6/2015 | Tokuyasu .............. G01F 15/043 73/202.5 |
| 2017/0268916 A1 | 9/2017 | Miki et al. |
| 2018/0245961 A1 | 8/2018 | Kamiya |

FOREIGN PATENT DOCUMENTS

| | | | | |
|---|---|---|---|---|
| JP | 2010-151795 A | | 7/2010 | |
| JP | 2012-052975 A | | 3/2012 | |
| JP | 2014001975 A | * | 1/2014 | ............ G01F 1/684 |
| JP | 2015-087254 A | | 5/2015 | |
| WO | 2016/092984 A1 | | 6/2016 | |

* cited by examiner

THERMAL FLOWMETER

TECHNICAL FIELD

The present invention relates to a thermal flowmeter.

BACKGROUND ART

As a conventional thermal flowmeter including an inlet air temperature sensor and a different detecting function, a flow rate measuring device including a housing in which a bypass flow channel that takes in a part of air flowing inside a duct, and a sub-bypass flow channel that is provided in a manner of branching from the bypass flow channel and that takes in a part of the air flowing in the bypass flow channel are formed, wherein a flow rate sensor, an inlet air temperature sensor, a humidity sensor, and a pressure sensor are installed in the sub-bypass flow channel side by side in a flow direction of the sub-bypass flow channel has been known (see claim 1, paragraph 0029 to 0035, and the like in PTL 1).

With the configuration, since various sensors are arranged side by side in the same flow channel, it becomes possible to unify connection to a circuit module and a connection mode with respect to an external device through the circuit module, and it is possible to provide a flow rate measuring device in which an arrangement of a wiring line or an assembling process can be simplified.

Also, by arranging various sensors in the sub-bypass flow channel in which intrusion of dust and an influence of disturbance such as pulsation are reduced, it is possible to provide a flow rate measuring device in which measurement accuracy and durability of the various sensors can be improved.

Also, in the conventional thermal flowmeter including an inlet air temperature sensor and a different detecting function, an inlet air temperature sensor, a humidity sensor, and a flow rate sensor are arranged and included in order of the inlet air temperature sensor, the humidity sensor, and the flow rate sensor from an upstream side. The flow rate sensor generates heat by a heater element. However, when the inlet air temperature sensor is arranged on the upstream side of the flow rate sensor, a flow rate measuring device in which the inlet air temperature sensor is not influenced by heat generation by the flow rate sensor and measurement accuracy is high can be provided.

CITATION LIST

Patent Literature

PTL 1: Japanese Patent Application Laid-Open No. 2015-87254

SUMMARY OF INVENTION

Technical Problem

Since the conventional thermal flowmeter has a configuration of installing various sensors in a sub-bypass in which air flows, there is a possibility that a pressure loss inside the sub-bypass is increased compared to a conventional state without the various sensors and that flow velocity sensitivity of a flow rate sensor is decreased.

Also, in a case where various sensors are installed in an upper stream and a lower stream of a flow rate sensor, there is a possibility that the various sensors become barriers of flowing air, fluid turbulence is generated, and noise performance or a pulsation characteristic of the flow rate sensor is deteriorated.

The present invention is provided in view of the forgoing problem and is to provide a thermal flowmeter which can reduce a decrease in flow velocity sensitivity of a flow rate sensor, and deterioration in noise performance or a pulsation characteristic compared to the related art.

Solution to Problem

In order to achieve the above purpose, a thermal flowmeter of the present invention is a thermal flowmeter used by being inserted from an attachment hole provided in a passage wall of a main passage into the inside of the main passage, the thermal flowmeter including: a flange to be fixed to an attachment part of the main passage; a sub-passage that takes in a part of measured gas flowing in the main passage, a flow rate measuring unit that measures a flow rate of the measured gas in the sub-passage; a circuit component that controls the flow rate measuring unit; and a circuit substrate on which the flow rate measuring unit and the circuit component are mounted, wherein the sub-passage is formed in a substrate of the circuit substrate. Also, in the thermal flowmeter, a sub-passage on a surface side of the circuit substrate on which side the flow rate measuring unit is provided and a second space, which is different from the sub-passage, on a rear surface side are separated by the circuit substrate, and at least one physical sensor other than the flow rate measuring unit, and the circuit component are arranged in the second space.

Advantageous Effects of Invention

According to a thermal flowmeter of the present invention, a sub-passage is included in a circuit substrate surface where a detection element is installed, and a space in which at least one physical sensor other than a flow rate measuring unit and a circuit component are installed is separately included on a rear surface side of the circuit substrate, whereby it is possible to improve flow velocity sensitivity of a flow rate sensor without increasing a pressure loss inside the sub-passage. Also, since various sensors to be barriers of fluid are not installed in the sub-passage, it is possible to stabilize flowing air and to improve noise performance or a pulsation characteristic of the flow rate sensor.

A further characteristic related to the present invention will become obvious from a description in the present description and attached drawings. Also, a problem, a configuration, and an effect other than what has been described above will be revealed by a description of the following embodiments.

DESCRIPTION OF EMBODIMENTS

In the following, embodiments of a thermal flowmeter of the present invention will be described with reference to the drawings.

First Embodiment

Figure 1:
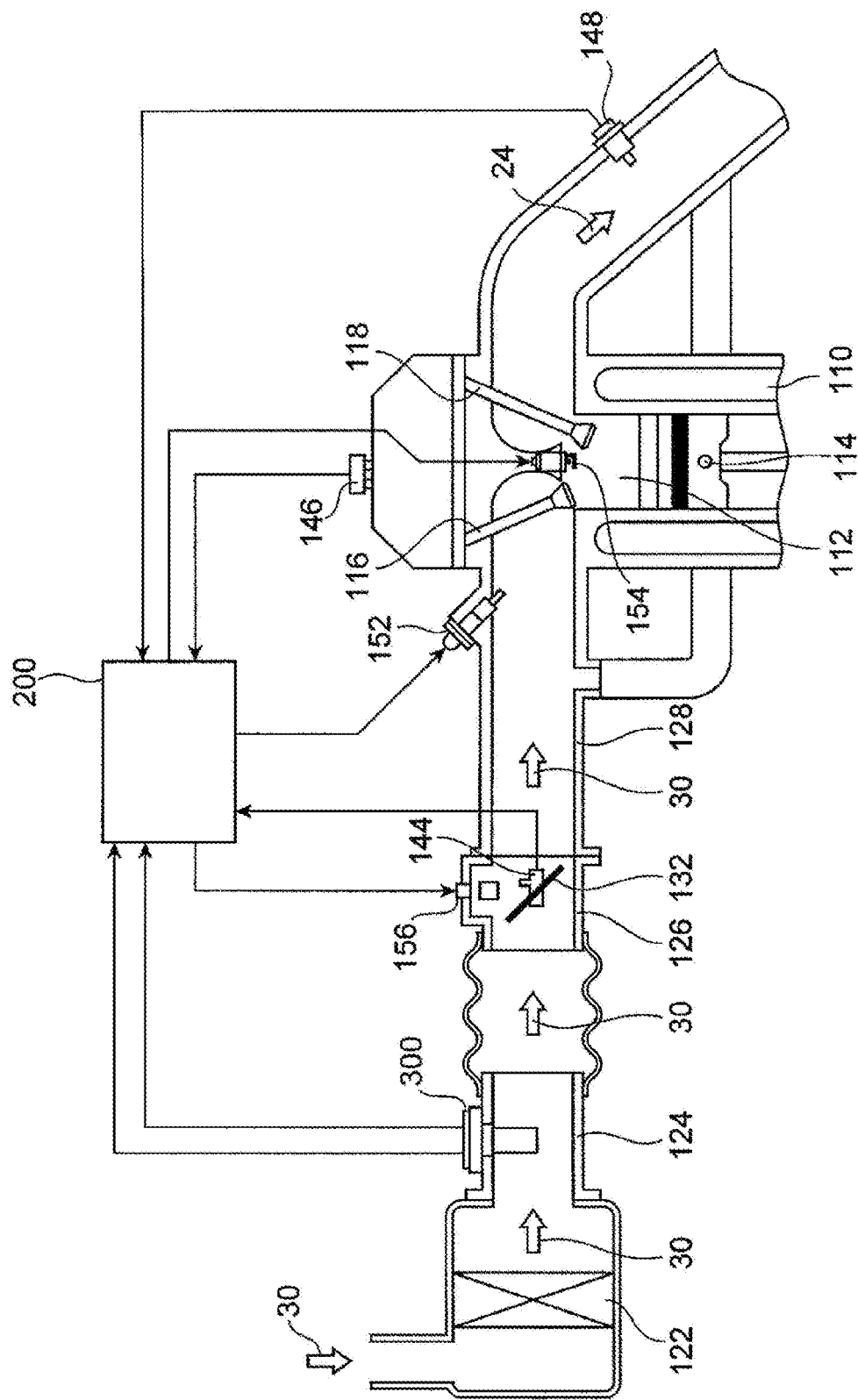
FIG. 1 is a schematic view illustrating an example of a system including a thermal flowmeter according to a first embodiment of the present invention.

FIG. 1 is a schematic view illustrating an example of an electronic fuel injection internal-combustion engine control system including a thermal flowmeter 300 according to the first embodiment of the present invention. In this system, based on operation of an internal-combustion engine 110 including an engine cylinder 112 and an engine piston 114, intake air is sucked as measured gas 30 from an air cleaner 122 and is guided to a combustion chamber of the engine cylinder 112, for example, through an inlet pipe that is a main passage 124, a throttle body 126, and an inlet manifold 128.

A flow rate of the measured gas 30 that is the intake air guided to the combustion chamber is measured by the thermal flowmeter 300. Based on the measured flow rate, fuel is supplied by a fuel injection valve 152 and is guided to the combustion chamber in a state of an air-fuel mixture along with the measured gas 30 that is the intake air. Note that in the present embodiment, the fuel injection valve 152 is provided in an inlet port of the internal-combustion engine. Fuel injected to the inlet port is mixed with the measured gas 30, which is the intake air, into an air-fuel mixture, is guided to the combustion chamber through an inlet valve 116, is burned, and generates mechanical energy.

The thermal flowmeter 300 can be used not only in a system of injecting fuel to the inlet port of the internal-combustion engine illustrated in FIG. 1 but also in a system of directly injecting fuel to each combustion chamber. Basic concepts of a measuring method of a control parameter which method includes a usage of the thermal flowmeter 300, and a control method of an internal-combustion engine which method includes an amount of fuel supply or ignition timing of the both systems are substantially the same. In FIG. 1, a system of injecting fuel to an inlet port is illustrated as a representative example of the both systems.

The fuel and air guided to the combustion chamber are in a mixed state of the fuel and the air, and are explosively burned by spark ignition by a sparking plug 154 and generates mechanical energy. Gas after the burning is guided from an exhaust valve 118 to an exhaust pipe and is exhausted as exhaust air 24 to the outside of a car from the exhaust pipe. A flow rate of the measured gas 30 that is the intake air guided to the combustion chamber is controlled by a throttle valve 132 an opening of which is changed based on operation of an accelerator pedal. An amount of fuel supply is controlled based on the flow rate of the intake air guided by the combustion chamber. By controlling a flow rate of the intake air guided to the combustion chamber by controlling the opening of the throttle valve 132, a driver can control mechanical energy generated by the internal-combustion engine.

A flow rate and a temperature of the measured gas 30 that is taken in from the air cleaner 122 and that is intake air flowing in the main passage 124 are measured by the thermal flowmeter 300, and an electric signal indicating the measured flow rate and temperature of the intake air is input from the thermal flowmeter 300 into a control device 200. Also, an output of a throttle angle sensor 144 that measures the opening of the throttle valve 132 is input into the control device 200, and an output of a rotational angle sensor 146 is input into the control device 200 to measure a position or a state of the engine piston 114 of the internal-combustion engine, the inlet valve 116, or the exhaust valve 118, and rotational speed of the internal-combustion engine. An output of an oxygen sensor 148 is input into the control device 200 to measure a state of a mixing ratio between a fuel amount and an air amount from a state of the exhaust air 24.

The control device 200 calculates a fuel injection amount or ignition timing based, for example, on a flow rate, humidity, and a temperature of the intake air which are outputs of the thermal flowmeter 300, and rotational speed of the internal-combustion engine, or the like from the rotational angle sensor 146. Based on a result of the calculation, an amount of fuel supplied from the fuel injection valve 152 or ignition timing at which ignition is performed by the sparking plug 154 is controlled. Actually, the amount of fuel supply or the ignition timing is controlled based further on an intake air temperature measured by the thermal flowmeter 300, a changing state of a throttle angle, a changing state of engine rotational speed, and a state of an air-fuel ratio measured by the oxygen sensor 148. Moreover, in an idling operation state of the internal-combustion engine, the control device 200 controls an amount of air that bypasses the throttle valve 132 by an idling air control valve 156, and controls rotational speed of the internal-combustion engine in the idling operation state.

Each of the amount of fuel supply and the ignition timing that is a major control amount of the internal-combustion engine is calculated with an output of the thermal flowmeter 300 as a main parameter. Thus, improving measuring accuracy, controlling temporal change, and improving reliability of the thermal flowmeter 300 are important for improving controlling accuracy or securing reliability of a vehicle. Specifically, recently, a demand for saving fuel of a vehicle is extremely high. Also, a demand for exhaust gas purification is extremely high. In order to respond to these demands, it is extremely important to improve measuring accuracy for a flow rate of the measured gas 30 that is the intake air measured by the thermal flowmeter 300.

Figure 2A:
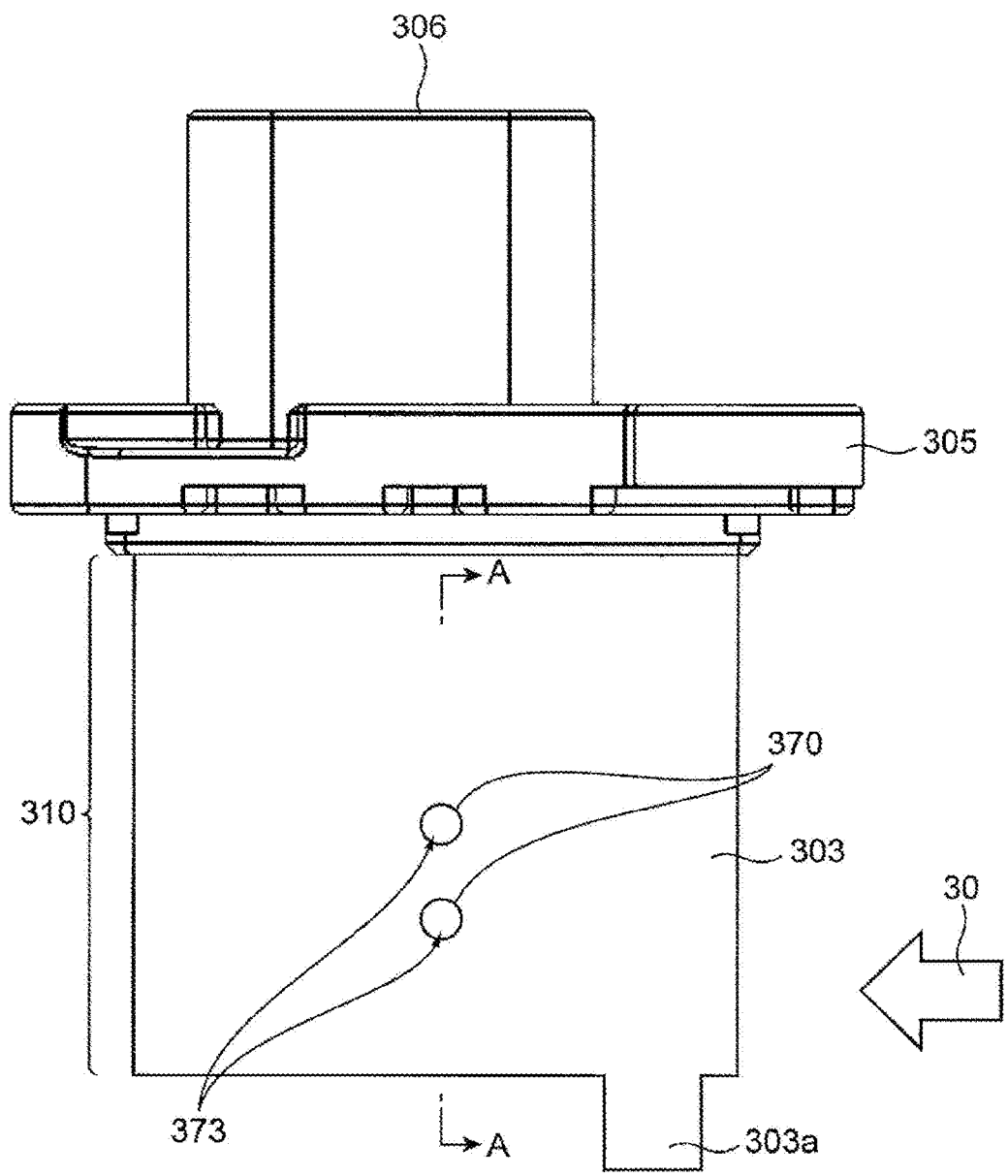
FIG. 2A is a front view of the thermal flowmeter according to the first embodiment of the present invention.
Figure 2B:
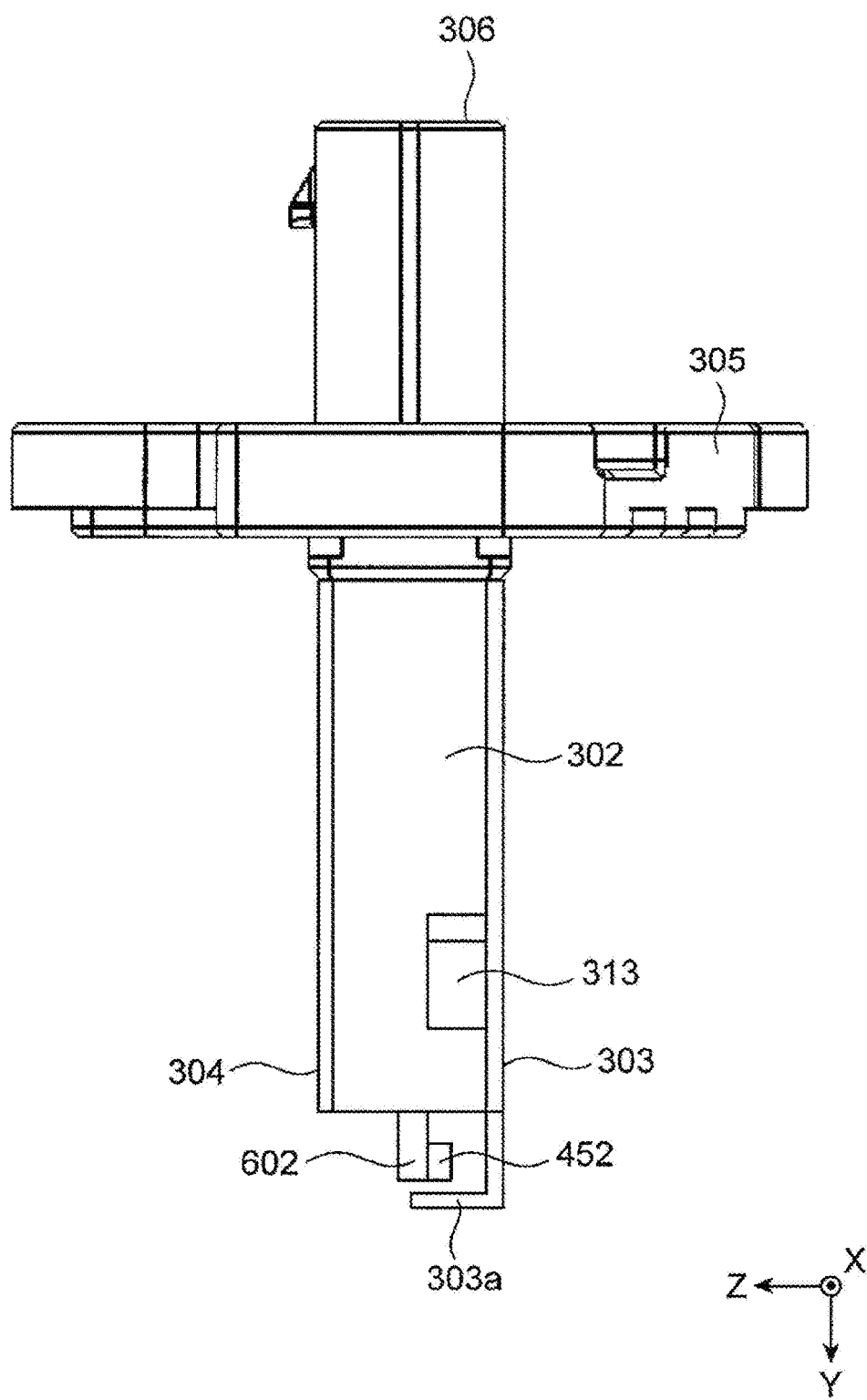
FIG. 2B is a left side view of the thermal flowmeter illustrated in FIG. 2A.
Figure 2C:
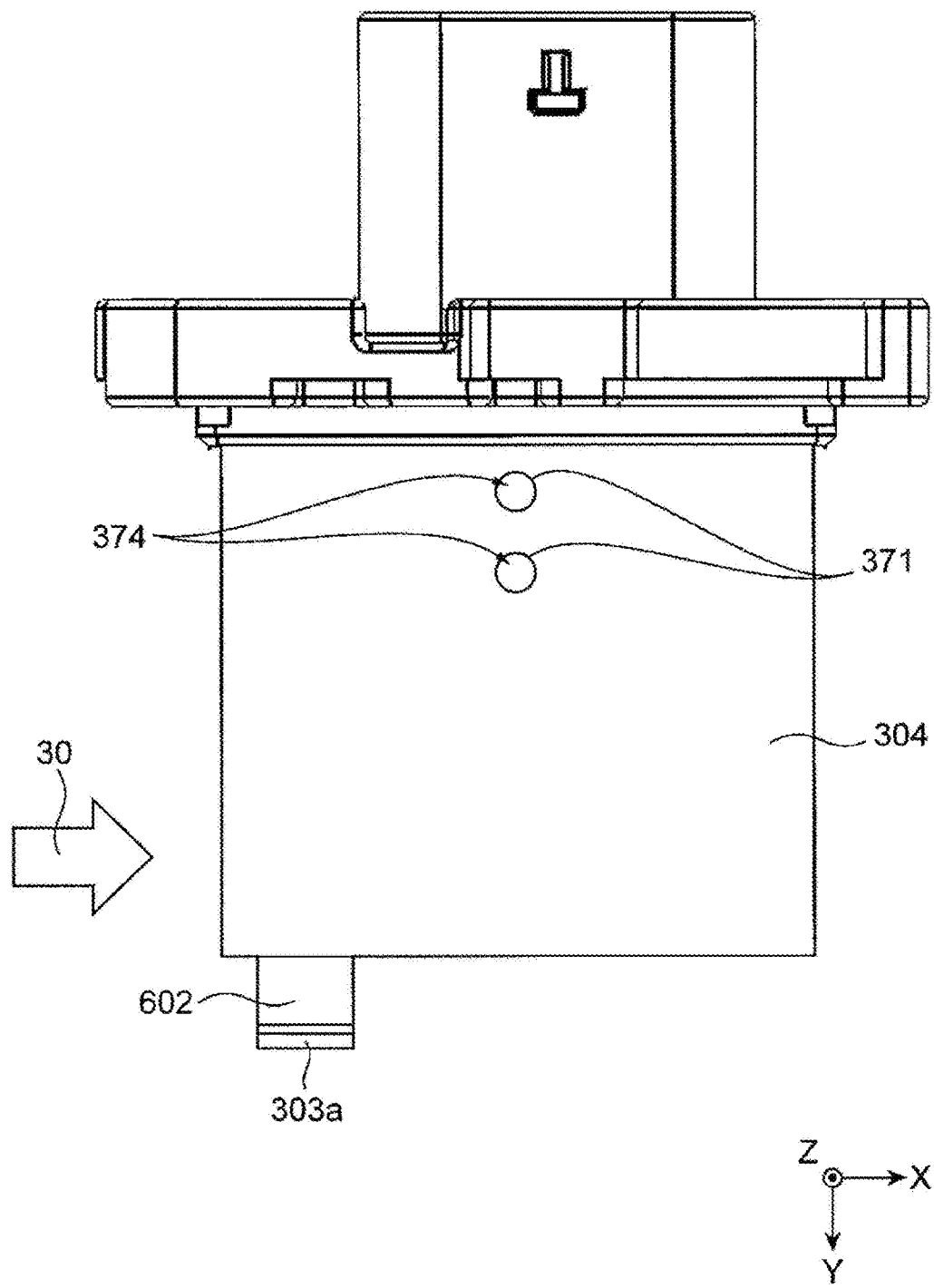
FIG. 2C is a rear view of the thermal flowmeter illustrated in FIG. 2A.
Figure 2D:
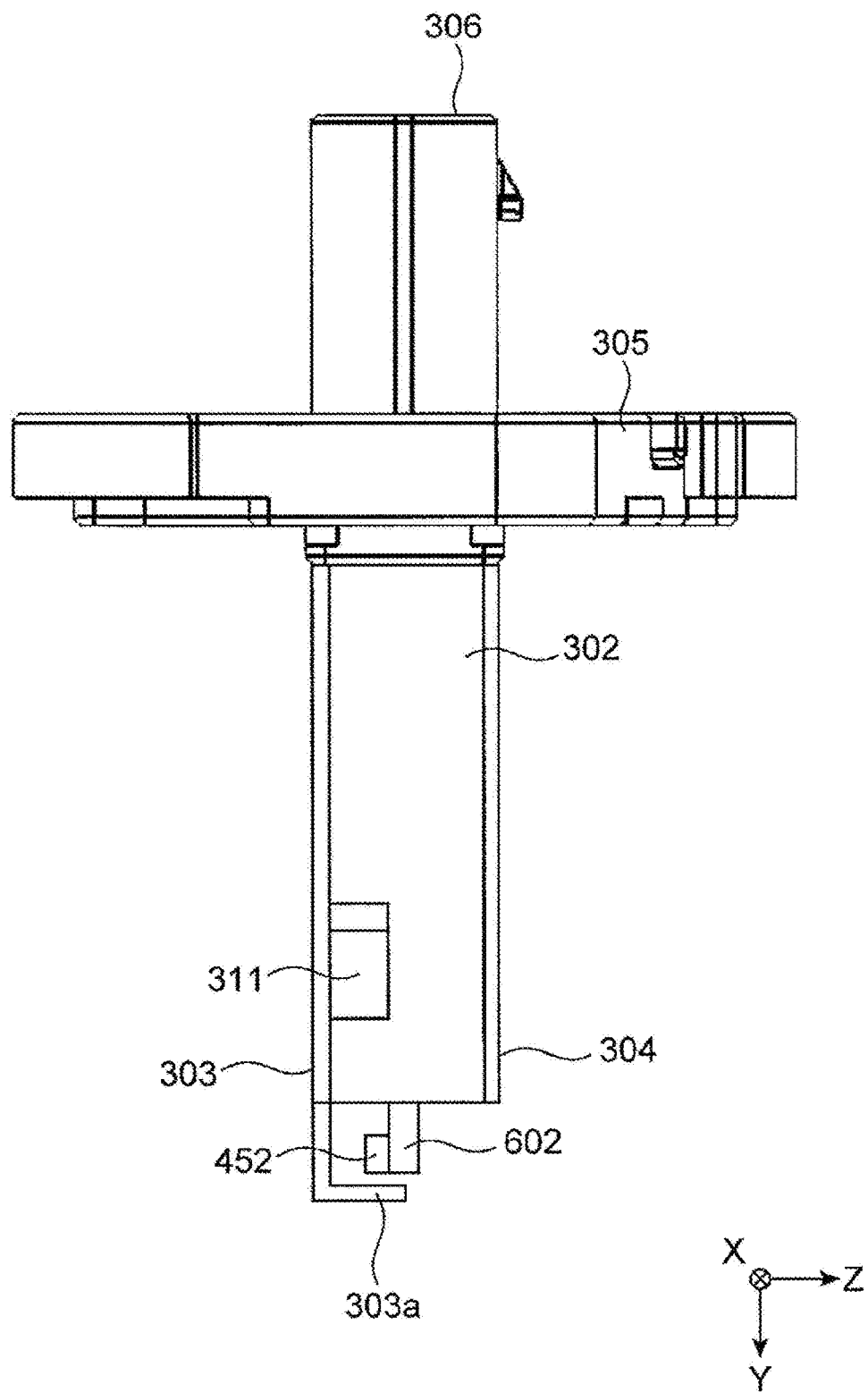
FIG. 2D is a right side view of the thermal flowmeter illustrated in FIG. 2A.
Figure 4A:
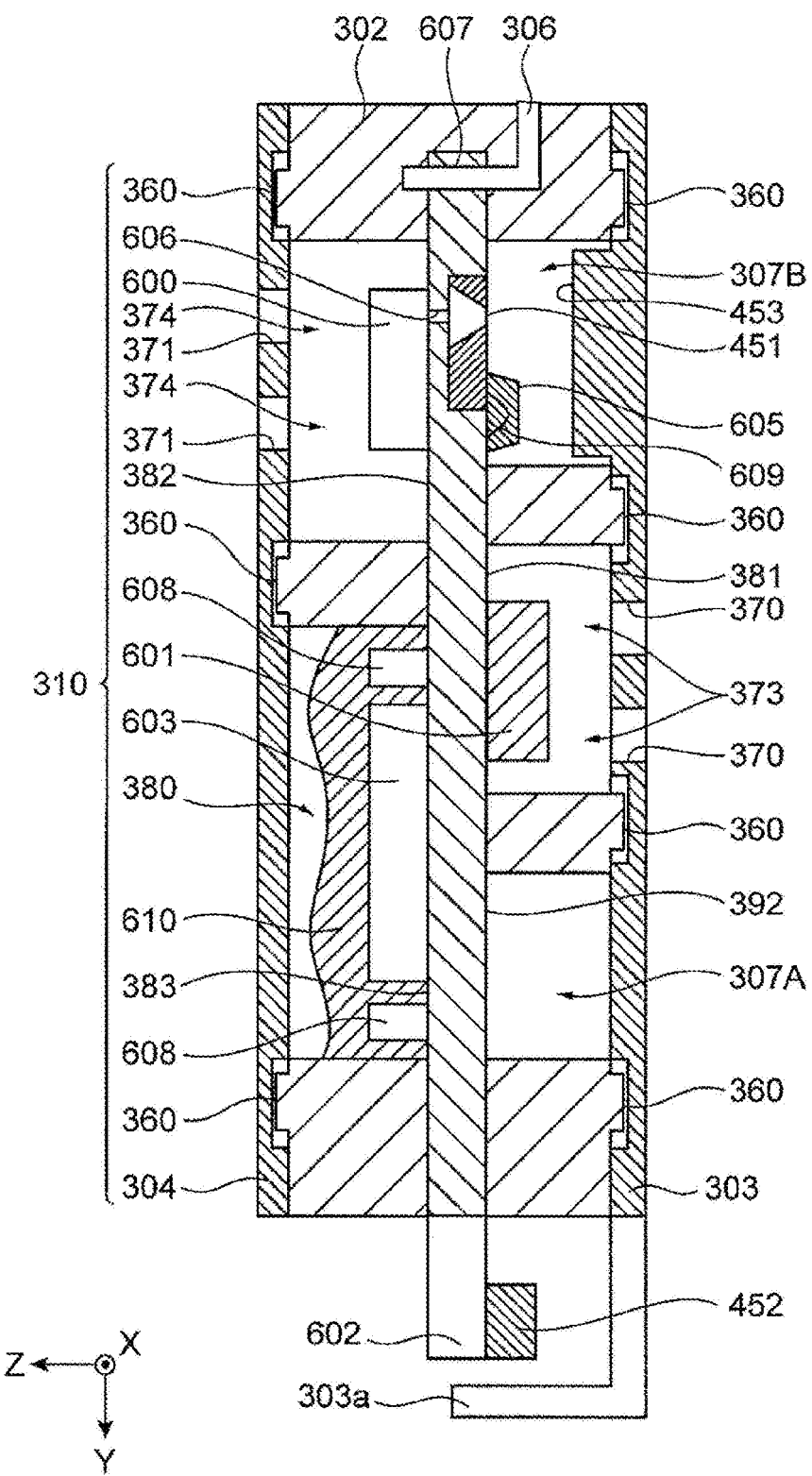
FIG. 4A is a sectional view along an A-A line of the thermal flowmeter illustrated in FIG. 2A.

FIG. 2A is a front view of the thermal flowmeter 300 according to the present embodiment. FIG. 2B, FIG. 2C, and FIG. 2D are respectively a left side view, a rear view, and a right side view of the thermal flowmeter illustrated in FIG. 2A. FIG. 4A is a sectional view along an A-A line of the thermal flowmeter illustrated in FIG. 2A.

The thermal flowmeter 300 is used by being inserted from an attachment hole provided in a passage wall of the main passage into the inside of the main passage. The thermal flowmeter 300 includes a housing 302, a front cover 303, and a back cover 304. The front cover 303 and the back cover 304 are formed in a thin tabular shape and have a wide flat cooling surface. Thus, a chassis 310 of the thermal flowmeter 300 has a configuration in which air resistance is reduced and which can be easily cooled by the measured gas flowing in the main passage 124.

The chassis 310 of the thermal flowmeter 300, for example, has a substantially rectangular-parallelepiped flat shape and is inserted into the inlet pipe and arranged in the main passage 124 as illustrated in FIG. 1. Although a detail will be described later, the chassis 310 demarcates a sub-passage (first space) that takes in a part of the measured gas 30 that is fluid flowing the main passage 124.

Note that in the following, there is a case where each part of the thermal flowmeter 300 will be described by utilization of an XYZ orthogonal coordinate system in which a length direction of the chassis 310 which direction is substantially in parallel with a flow of the measured gas 30 in the main passage 124 is an X-axis direction, a height direction of the chassis 310 which direction is vertical to the length direction and substantially in parallel with a radial direction of the main passage 124 is a Y-axis direction, and a thickness direction of the chassis 310 which direction is vertical to these length direction and height direction is a Z-axis direction.

The chassis 310 has a shape extended in the Y-axis direction from an outer wall toward a center of the main passage 124, and has a flat shape having a thin thickness in the Z-axis direction as illustrated in FIG. 2B and FIG. 2D. That is, the chassis 310 of the thermal flowmeter 300 has a shape with a thin thickness along a side surface and with a substantially rectangular front shape. Accordingly, in the thermal flowmeter 300, it is possible to reduce fluid resistance with respect to the measured gas 30 and to include a sub-passage of an enough length.

At a base end part of the chassis 310, a flange 305 to fix the thermal flowmeter 300 to the inlet pipe, and a connector 306 that is an external connection unit exposed to the outside of the inlet pipe for electrical connection with an external device are provided. The chassis 310 is supported in a cantilever manner by fixation of the flange 305 to an attachment part of the inlet pipe.

Figure 3A:
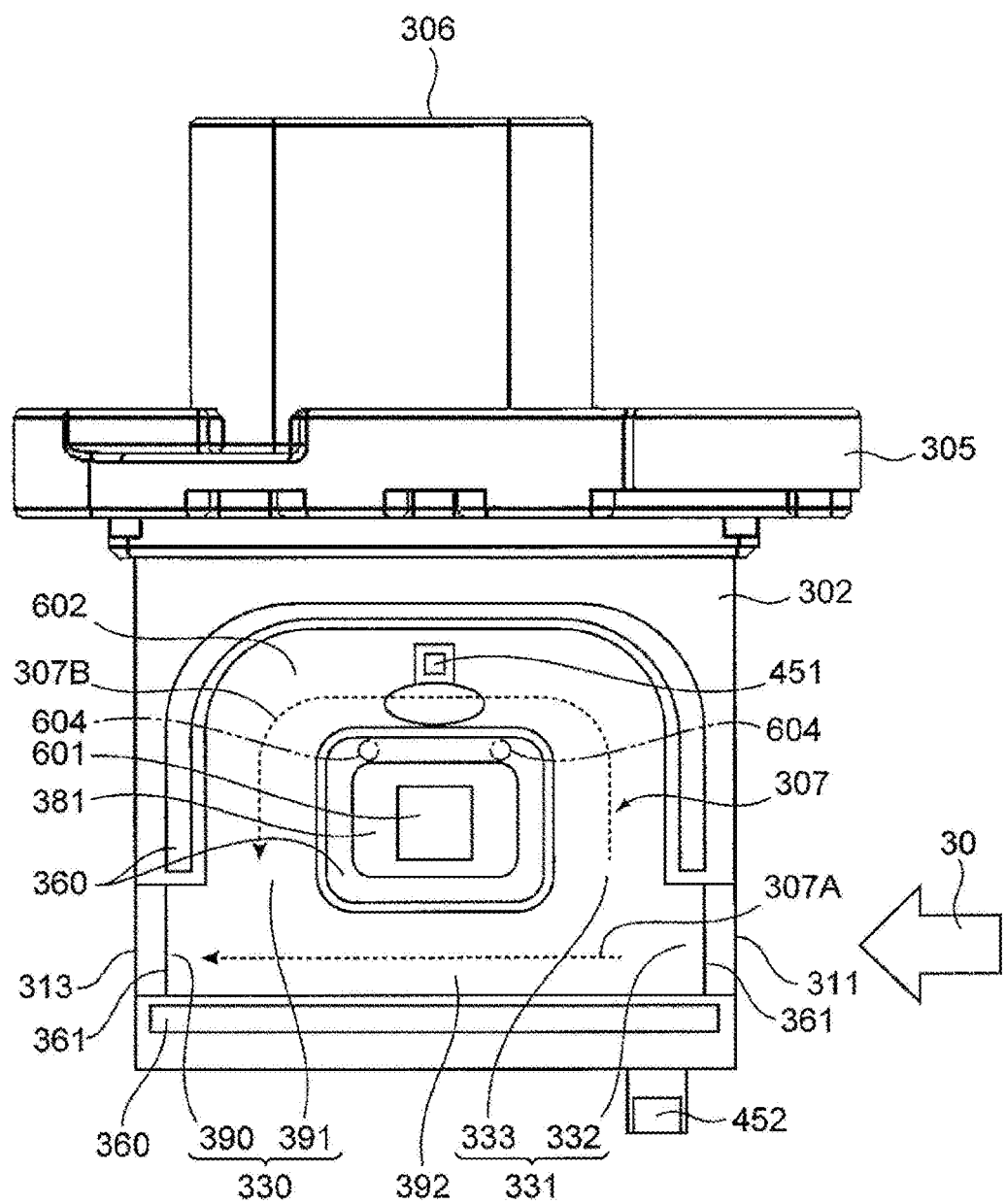
FIG. 3A is a front view of a state in which a front cover of the thermal flowmeter illustrated in FIG. 2A is removed.
Figure 3B:
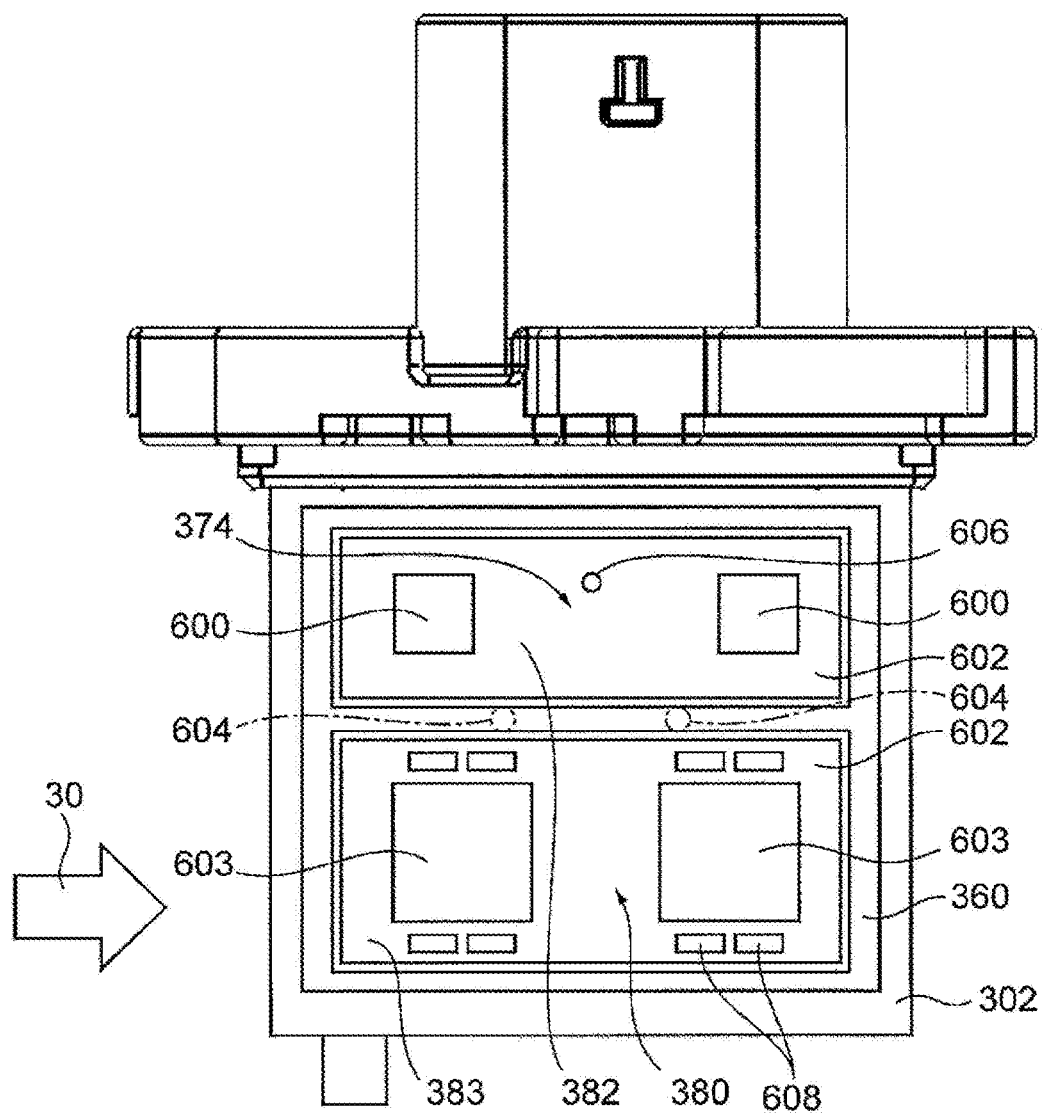
FIG. 3B is a rear view of a state in which a back cover of the thermal flowmeter illustrated in FIG. 2C is removed.
Figure 3C:
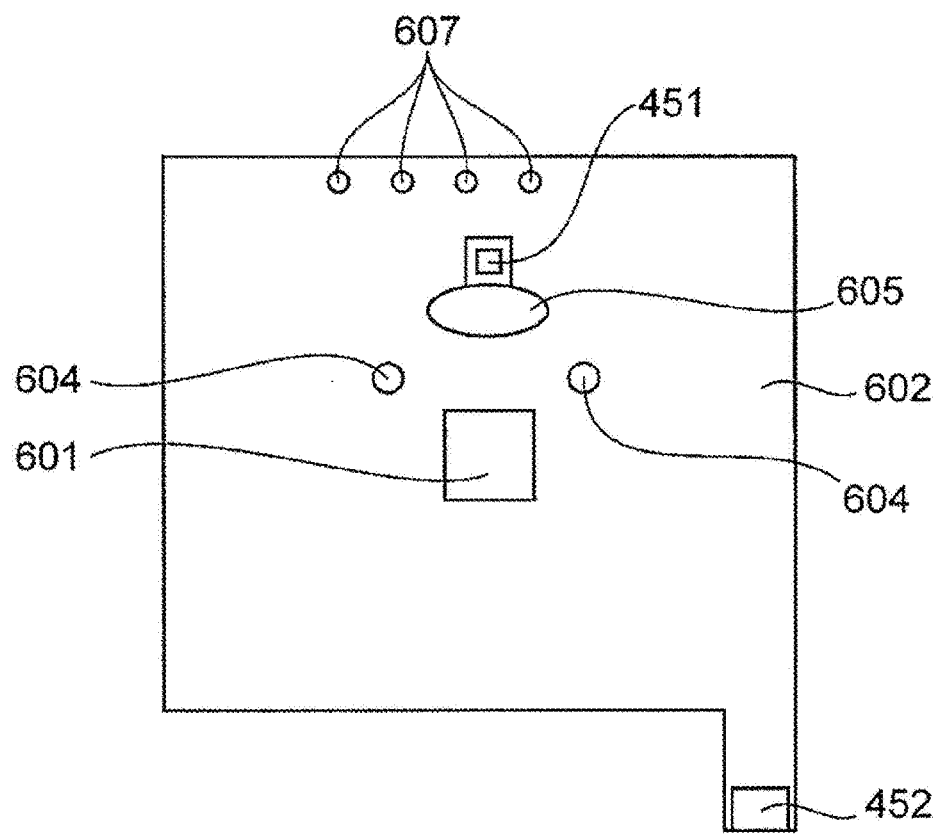
FIG. 3C is a front view of a state in which a housing of the thermal flowmeter illustrated in FIG. 3A is removed.
Figure 3D:
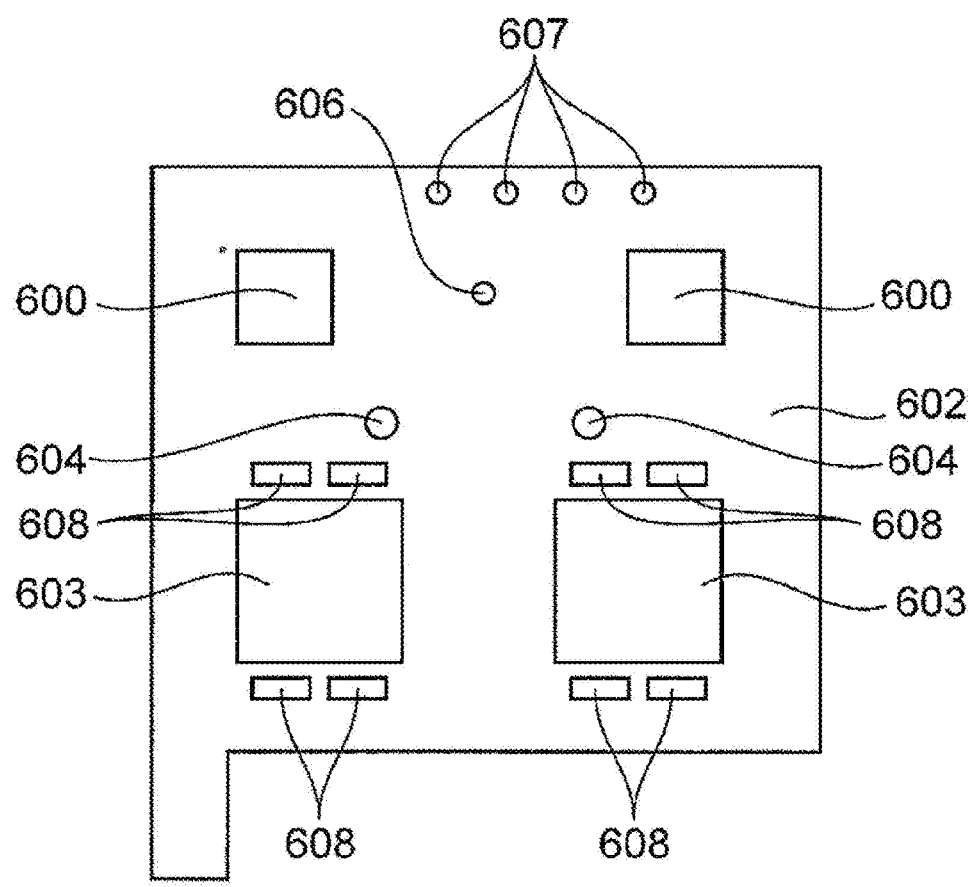
FIG. 3D is a rear view of a state in which a housing of the thermal flowmeter illustrated in FIG. 3B is removed.

FIG. 3A is a front view of a state in which the front cover 303 of the thermal flowmeter 300 illustrated in FIG. 2A is removed. FIG. 3B is a rear view of a state in which the back cover 304 of the thermal flowmeter 300 illustrated in FIG. 2C is removed. FIG. 3C is a front view of a circuit substrate 602 in a state in which the housing 302 of the thermal flowmeter 300 illustrated in FIG. 3A is removed. FIG. 3D is a rear view of the circuit substrate 602 in a state in which the housing 302 of the thermal flowmeter 300 illustrated in FIG. 3B is removed.

At one end part arranged in a position on a leading end side of the housing 302 and on an upstream side in a main flow direction, an inlet 311 to take a part of the measured gas 30 such as the intake air that is fluid flowing in the main passage 124 into a sub-passage 307 is provided. Also, similarly, at the other end part arranged in a position on the leading end side of the housing 302 and on a downstream side in the main flow direction, an outlet 313 to let the measured gas 30 back to the main passage 124 from the sub-passage 307 is provided. In such a manner, the inlet 311 or the outlet 313 to take the measured gas 30 flowing in the main passage 124 into the sub-passage 307 are provided on the leading end side of the chassis 310 extended in a central direction in a radial direction of the main passage 124 from the flange 305.

In a position that is on the one end part side and is on the leading end side of the inlet 311 placed on the leading end side of the housing 302, a temperature measuring unit 452 to measure a temperature of the measured gas 30 flowing in the main passage 124 is provided. In such a manner, the temperature measuring unit 452 to measure the temperature of the measured gas 30 flowing in the main passage 124 is provided in a manner of being protruded to the leading end side of the chassis 310 extended in the central direction in the radial direction of the main passage 124 from the flange 305. By making the temperature measuring unit 452 protruded from the chassis (module) 310, exposed to a part which is around a center of the main passage (intake air passage) 124 and in which flow velocity is high, and exposed to the intake air, it is possible to reduce heat conduction from the chassis (module) 310 and to efficiently transmit heat to the intake air. As a result, it becomes possible to accurately detect the temperature of the intake air.

In the present embodiment, since the temperature measuring unit 452 is protruded to the leading end side of the chassis 310, a guard part 303a is provided in the vicinity of the temperature measuring unit 452 for protection from the outside. Although the guard part 303a is provided in the front cover 303, a guard part may be additionally included in the back cover 304 when necessary.

In the thermal flowmeter 300 having a configuration in the manner of the present embodiment, it is possible to take gas in a part separated from an inner wall surface of the main passage 124 into the sub-passage 307, to become less likely to be influenced by a temperature of the inner wall surface of the main passage 124, and to control a decrease in measuring accuracy of a flow rate or a temperature of the gas. Also, in the vicinity of the inner wall surface of the main passage 124, fluid resistance is high, and flow velocity becomes low compared to average flow velocity in the main passage 124. In the thermal flowmeter 300 of the present embodiment, the inlet 311 is provided in a leading end part of the thin and long chassis 310 extended from the flange 305 toward a center of the main passage 124. Thus, it is possible to take gas having high flow velocity around the center of the main passage 124 into the sub-passage 307.

On a surface side and a rear surface side of the chassis 310, a plurality of air vents 370 and 371 to take a part of the measured gas 30 flowing in the main passage 124 into the chassis 310 is provided. Accordingly, it is possible to take a part of the gas in the main passage 124 into ventilated spaces 373 and 374, to become less likely to be influenced by the temperature of the inner wall surface of the main passage 124, and to control a decrease in measuring accuracy of humidity or pressure of the gas. At least one each of the air vents 370 and 371 only need to be provided, and two each thereof are provided in the present embodiment.

In the inside of the housing 302, a circuit substrate 602 including a flow rate measuring unit 451 to measure a flow rate of the measured gas 30 flowing in the main passage 124, a temperature measuring unit 452 to measure a temperature of the measured gas 30 flowing in the main passage 124, a pressure measuring unit 600 to measure pressure of the measured gas 30 flowing in the main passage 124, a humidity measuring unit 601 to measure humidity of the measured gas 30 flowing in the main passage 124, a circuit component 603 to control these plurality of measuring units, and an electronic component 608 such as a capacitor is arranged. The flow rate measuring unit 451, the temperature measuring unit 452, the pressure measuring unit 600, and the humidity measuring unit 601 are included in a physical sensor.

In a position on the leading end side of the housing 302, the circuit component 603 to control the plurality of measuring units is provided. The circuit component 603 is a Large Scale Integration (LSI) circuit or a microcomputer or both, and heat is generated during driving. In the present embodiment, the flange 305, the flow rate measuring unit 451, and the circuit component 603 are installed in this order in a longitudinal direction (Y-axis direction) of the housing 302 which direction is an insertion direction of the thermal flowmeter 300, whereby the circuit component 603 can be provided in a position on a center side of the main passage 124 which position is separated from the inner wall surface of the main passage 124.

The circuit component 603 can be placed on the center side where flow velocity is high compared to average flow velocity in the main passage 124, heat generated in driving of each measuring unit can be cooled efficiently, and the plurality of measuring units can be controlled accurately.

The sub-passage 307 is formed on a substrate of the circuit substrate 602. On a front surface side of the housing 302, sub-passage grooves 330, 331, and 392 to demarcate the sub-passage 307 are formed. Also, on the front surface side of the housing 302, a recessed part 381 to demarcate the ventilated space 373 is formed. In the present embodiment, the sub-passage grooves 330, 331, and 392 are provided in a recessed manner in a position where the flow rate measuring unit 451 is arranged in the housing 302, and the recessed part 381 is provided in a recessed manner in a position where the humidity measuring unit 601 is arranged in the housing 302. Recessed bottom wall surfaces of the sub-passage grooves 330, 331, and 392, and the recessed part 381 are formed by the circuit substrate 602 or the molded housing 302. In the present embodiment, a surface of the circuit substrate 602 configures a part of the sub-passage grooves 330, 331, and 392, and a rear surface of the circuit substrate 602 configures a part of the recessed part 381.

On the one hand, on a rear surface side of the housing 302, a recessed part 382 to demarcate the ventilated space (second space) 374 is formed. Also, on the rear surface side of the housing 302, a recessed part 383 to demarcate a circuit chamber 380 is formed. In the present embodiment, the recessed part 382 is provided in a recessed manner in a position where the pressure measuring unit 600 is arranged in the housing 302, and the recessed part 383 is provided in a recessed manner in a position where the circuit component 603 to control the plurality of measuring units, and the electronic component 608 such as a capacitor are arranged in the housing 302. Recessed bottom wall surfaces of the recessed parts 382 and 383 are formed by the circuit substrate 602 or the molded housing 302.

By attaching the front cover 303 to a front surface of the housing 302 and covering the sub-passage grooves 330, 331, and 392 and an open part of the recessed part 381 of the housing 302 with the front cover 303, it is possible to configure the chassis 310 to demarcate the sub-passage 307 and the ventilated space 373. Also, by attaching the back cover 304 to a rear surface of the housing 302 and covering open parts of the recessed parts 382 and 383 of the housing 302 with the back cover 304, it is possible to configure the chassis 310 to demarcate the ventilated space 374 and the circuit chamber 380.

The sub-passage 307 includes a main passage 307A linearly extended in the length direction (X-axis direction) from the one end part to the other end part of the housing 302, and a bypass passage 307B that branches at a position in the middle of the main passage 307A, that is once separated to a base end side of the housing 302, and that joins the main passage 307A again. The ventilated space 373 is formed in a position surrounded by the main passage 307A and the bypass passage 307B.

On the front surface and the rear surface of the housing 302, a welded protrusion part 360 formed of resin is provided, and joined by welding of the front cover 303 and the back cover 304. In the present embodiment, a configuration of being joined by a method of welding has been described. However, joining by a method of adhering may be also performed. The front cover 303 and the back cover 304 are made of resin, and are included in a part of an inner wall of the sub-passage 307 by being adhered or welded to the housing 302.

With respect to the housing 302 having a configuration in the manner of the present embodiment, for example, by using a mold arranged on both surfaces and by molding the circuit substrate 602 illustrated in FIG. 3C and FIG. 3D as an inserted component in a resin molding process of molding the housing 302, it is possible to mold the housing 302 illustrated in FIG. 3A and FIG. 3B and to configure the housing 302 with high dimensional accuracy. The circuit substrate 602 has partially-molded resin, and the inner wall of the sub-passage 307 includes a surface on which the flow rate measuring unit 451 is provided and a surface of the resin of the circuit substrate 602.

Also, with respect to the housing 302, a process can be simplified since molding of the sub-passage grooves 330, 331, and 392 on the front surface side of the housing 302 and molding of the recessed part 381 and the recessed parts 382 and 383 on the rear surface side of the housing 302 can be performed collectively. Accordingly, it is possible to realize the thermal flowmeter 300 with a simple configuration and with few mounting variations.

Figure 4B:
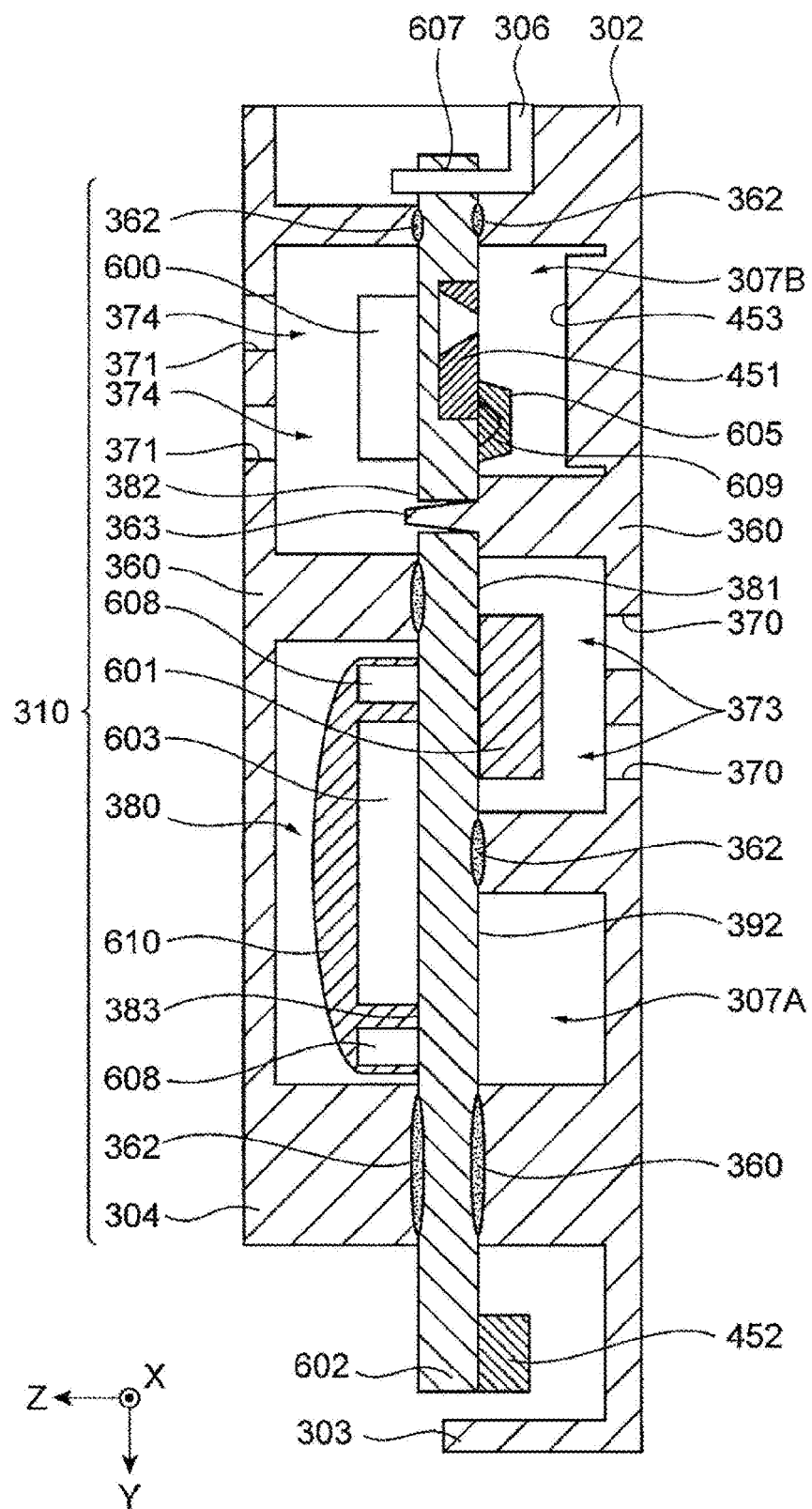
FIG. 4B is a schematic sectional view of a housing of the thermal flowmeter illustrated in FIG. 4A.

FIG. 4B is a schematic sectional view of a housing of the thermal flowmeter illustrated in FIG. 4A.

In the present embodiment, although integral molding to partially mold a part of the circuit substrate 602 is employed, such a configuration is not a limitation. For example, as illustrated in FIG. 4B, sub-passage grooves 330, 331, and 392, and recessed parts 381, 382, and 383 may be formed by joining of a resin body, which is included in a housing 302, to a circuit substrate 602 by an adhesive material 362 or a press-fit pin 363. The resin body includes a recessed part, and is included in a part of an inner wall of a sub-passage by being adhered or crimped to a surface, which is on a side where a flow rate measuring unit 451 is provided, of the circuit substrate 602. In the structure illustrated in FIG. 4B, joining is performed by pressing of the press-fit pin 363 provided in the resin body into a through hole provided in the circuit substrate 602, and joining is performed by pasting of the adhesive material 362 between the resin body and the circuit substrate 602.

Also, with the thermal flowmeter 300 having a configuration in the manner of the present embodiment, it is possible to configure a size in the height direction (Y-axis direction) of the housing 302 short in a state in which a plurality of measuring units is included, and to realize a thermal flowmeter 300 that has a low pressure loss and that does not block a flow of the gas in the main passage 124. Also, it is possible to mount a plurality of measuring units in a common housing 302, and to realize a thermal flowmeter 300 that is smaller than a conventional size and that has various kinds of measuring functions.

In a front surface of the housing 302, the sub-passage grooves 330, 331, and 392 that form the sub-passage 307 in cooperation with the front cover 303 are provided in a recessed manner. The sub-passage grooves 330, 331, and 392 include a linear groove part 332, the sub-passage groove 392, a linear groove part 390 to demarcate the linear main passage 307A in a part of the sub-passage 307, and branching groove parts 333 and 391 to demarcate the bypass passage 307B in a part of the sub-passage 307.

The linear groove part 332 is linearly extended in the main flow direction (X-axis direction) of the measured gas 30 at the leading end part of the housing 302, one end thereof communicating with the inlet 311 of the housing 302 and further communicating with the sub-passage groove 392, and the other end thereof communicating with the outlet 313 of the housing 302. The sub-passage groove 392 becomes a vent to discharge fluid flowing in the main passage 307A of the sub-passage 307, that is, a part of the measured gas 30. By installing the sub-passage groove 392, it is possible to discharge a foreign substance such as dust or a waterdrop to the outside from the sub-passage 307, to reduce a total amount of the foreign substance taken into the bypass passage 307B of the sub-passage 307, and to prevent deterioration in measuring performance of the flow rate measuring unit 451.

The branching groove part 333 advances in a curve toward the base end side of the housing 302 while branching from the linear groove part 332, and communicates with a center part in the height direction (Y-axis direction) that is the longitudinal direction of the housing 302. A throttle 453 is installed in a surface facing the flow rate measuring unit 451. The throttle 453 is provided in such a manner as to be protruded toward the flow rate measuring unit 451 integrally with the front cover 303. The bypass passage 307B is temporarily reduced in the height direction (Z-axis direction) that is the thickness direction of the housing 302 by the throttle 453 and becomes the original size after passing through the part of the throttle 453. The branching groove part 333 further advances in a curve toward the leading end side of the housing 302, communicates with the branching groove part 391, and joins the linear groove part 390.

In the bypass passage 307B, fluid in which a total amount of foreign substances is reduced flows, and dust, a waterdrop, or the like can be deflected to the base end side of the housing 302 compared to the flow rate measuring unit 451 by an inertial effect of the curved shape, whereby deterioration in measuring performance of the flow rate measuring unit 451 can be prevented. Also, it is possible to improve measuring performance of the flow rate measuring unit 451 by reducing the flow of the fluid by the throttle 453 in the part of the flow rate measuring unit 451 in the bypass passage 307B.

In the thermal flowmeter 300 in which the sub-passage 307 includes the main passage 307A and the bypass passage 307B in the manner of the present embodiment, an unnecessary space is generated in a part surrounded by the main passage 307A and the bypass passage 307B. In the present embodiment, the ventilated space (third space) 373 is formed by molding of the recessed part 381 in this unnecessary space. It is possible to install at least one physical sensor such as the humidity measuring unit 601 in this ventilated space 373 and to reduce a size of the housing 302.

The circuit substrate 602 is continuously flush with the bottom wall surfaces of the linear groove parts 332 and 390 without a step. The recessed bottom wall surfaces of the sub-passage grooves 333, 391, and 392 are also continuously flush without a step since being formed by the circuit substrate 602. The circuit substrate 602 configures whole one side wall surface among four side wall surfaces included in the bypass passage 307B, that is, whole bottom wall surfaces of the sub-passage grooves 333 and 391.

In a configuration in the manner of the present embodiment, there is no recess/protrusion to block the fluid flowing in the main passage 307A or the fluid flowing in the bypass passage 307B. Thus, it is possible to stabilize the air flowing in the sub-passage 307 and to reduce a pressure loss of the flow in the sub-passage 307 by reduction of a separation vortex. Thus, in the thermal flowmeter 300 having such a configuration, it is possible to improve flow velocity sensitivity of the flow rate measuring unit 451, and to improve noise performance or a pulsation characteristic.

In the circuit substrate 602, a through hole 604 that communicates with a surface to a rear surface of the circuit substrate 602 is formed. In the present embodiment, the through hole 604 is provided in a position where a recessed wall surface of the recessed part 381 is formed. In molding, the through hole 604 is filled with a part of resin included in the wall surface, and coupling with resin that forms a wall surface on the rear surface side of the circuit substrate 602 is performed. The circuit substrate 602 is a printed substrate. Adhesion on an interfacial surface between a surface of the printed substrate and resin is weak and there is a possibility that the recessed wall surface of the recessed part 381 comes off. Thus, it is possible to include an effect of preventing the recessed wall surface of the recessed part 381 from coming off by providing the through hole 604 in which the resin communicates and connecting the surface side and the rear surface side of the circuit substrate 602 through the through hole 604.

Also, on the surface of the circuit substrate 602 included in a part of the bypass passage 307B, that is, a surface of the circuit substrate 602 which surface faces the fluid flowing in the sub-passage 307, a resist film or a surface treated film having a high hydrophilic property or water-repellent property is included, and grounding may be performed by pattern exposure or surface treating, for example. The resist film or the surface treated film may be provided on a whole surface of the circuit substrate 602 or may be provided only on a part included in the bypass passage 307B.

In a configuration in the manner of the present embodiment, in a case where a contaminant (such as dust, carbon, or waterdrop) intrudes into the sub-passage 307, the contaminant is less likely to be attached to an inner wall of the passage and it is possible to reduce deterioration in measuring performance of the flow rate measuring unit 451. With the thermal flowmeter 300 having such a configuration, it is possible to provide a flow rate measuring device with high reliability in which device a contaminant-resistant property can be improved.

In the surface of the circuit substrate 602, a recessed part to install the flow rate measuring unit 451 is provided, and the flow rate measuring unit 451 is installed in the recessed part. The flow rate measuring unit 451 is a MEMS element having a thin-film diaphragm shape. An air vent 606 to prevent pressure from affecting the MEMS element is provided in the rear surface of the circuit substrate 602.

To the flow rate measuring unit 451, the circuit substrate 602 is electrically connected through a bonding wire 609 one end side of which is connected to the flow rate measuring unit 451, and a seal material 605 to cover the bonding wire is provided. The seal material 605 is provided on a circuit component side compared to the flow rate measuring unit 451. In the present embodiment, the flow rate measuring unit 451, the seal material 605, and the circuit component 603 are arranged in this order in the longitudinal direction (Y-axis direction) of the housing 302. Thus, it is possible to efficiently arrange a wiring line connected from the flow rate measuring unit 451 to the circuit substrate 602, and then to the circuit component 603.

The circuit chamber 380 is formed by the housing 302 and the recessed part 383, that is, the circuit substrate 602 and the back cover 304. In the circuit chamber 380, the circuit component 603 to control the plurality of measuring units, and the electronic component 608 such as a capacitor are provided. Also, the circuit chamber 380 is filled with a seal material 610 such as gel or an adhesive material to protect a contaminant with a high permeable action (such as corrosive gas or liquid). Thus, it is possible to improve reliability with respect to a contaminant with a high permeable action and to realize the thermal flowmeter 300 with high durability.

On the surface and the rear surface of the circuit substrate 602, a communicating through hole 607 is formed. In the present embodiment, a configuration in which a terminal of the connector 306 that is an external connection unit exposed to the outside of the inlet pipe for electrical connection with an external device is conducted by being pressed into the through hole 607 is provided. In the present embodiment, the configuration of conducting the circuit substrate 602 and the terminal of the connector 306 by press-fitting is employed. However, connection through a bonding wire or a paste may be employed.

Second Embodiment

Figure 5A:
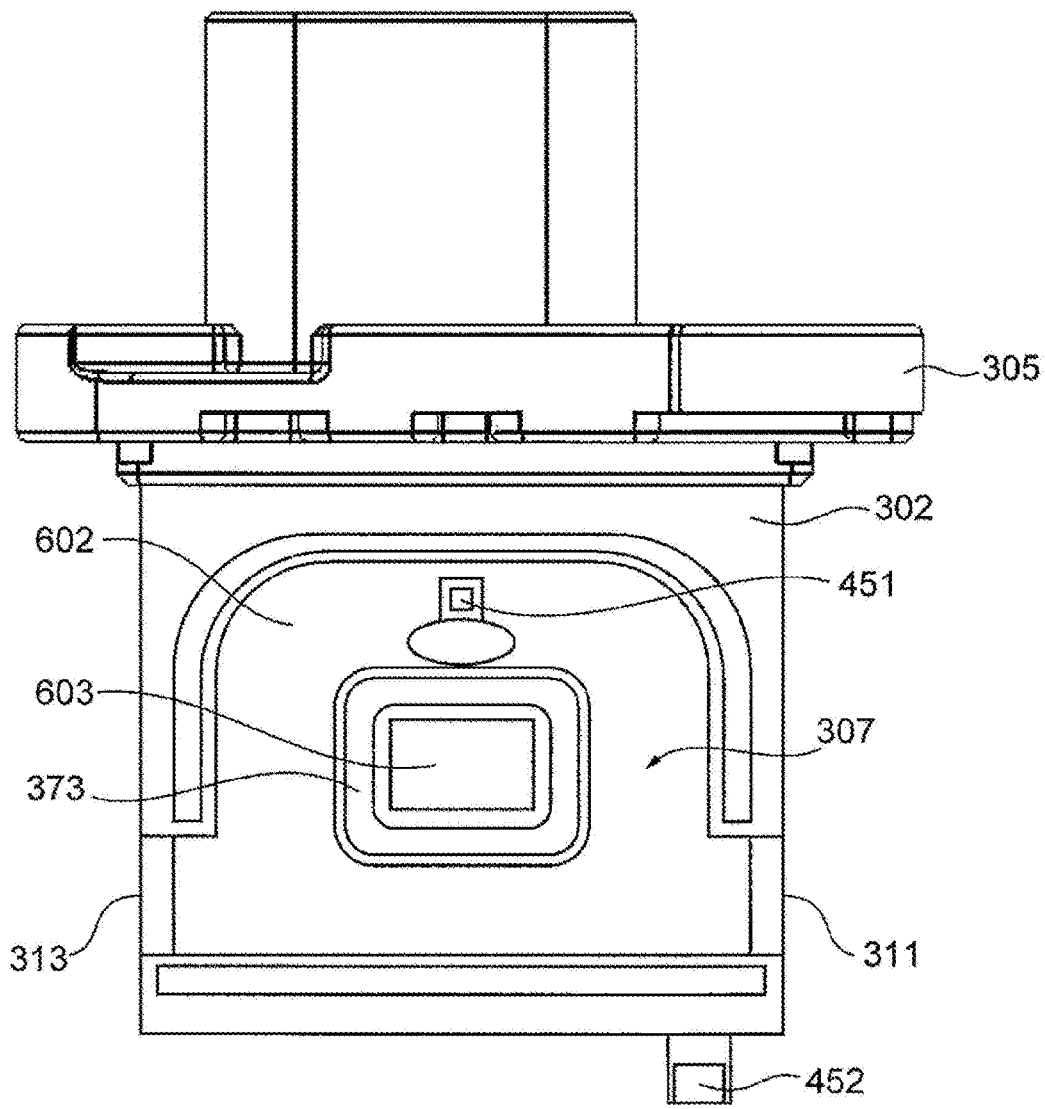
FIG. 5A is a schematic front view of a housing of a thermal flowmeter according to a second embodiment of the present invention.
Figure 5B:
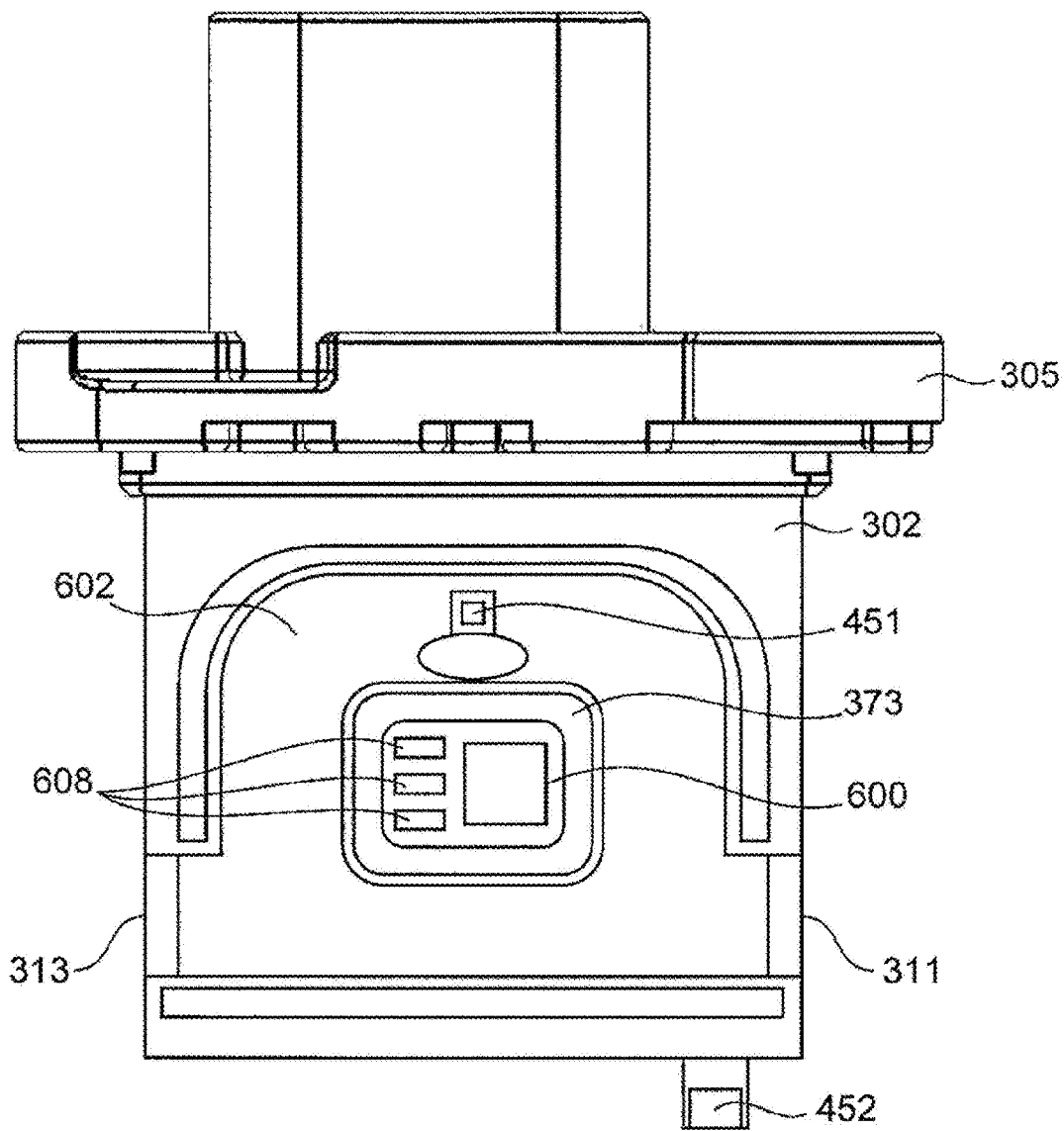
FIG. 5B is a schematic front view of a housing of a thermal flowmeter according to the second embodiment of the present invention.

FIGS. 5A and 5B are schematic front views of a housing 302 of a thermal flowmeter 300 according to the second embodiment.

In the present embodiment, a configuration in which a humidity measuring unit 601 is mounted on a surface of the housing 302, a pressure measuring unit 600, a circuit component 603, and an electronic component 608 such as a capacitor are mounted on a rear surface of the housing 302 is employed. However, any combination of configuration positions may be employed. In the following, a combination example of configuration positions will be described.

A configuration in which the circuit component 603 is installed in a ventilated space 373 is illustrated in FIG. 5A, and a configuration in which the pressure measuring unit 600 and the electronic component 608 such as a capacitor are arranged in combination in the ventilated space 373 is illustrated in FIG. 5B. The ventilated space 373 may be filled with a seal material 610 such as gel or an adhesive material to protect the circuit component 603 or the electronic component 608 such as a capacitor.

In a configuration in the manner of the present embodiment, a combination on a circuit substrate 602 can respond flexibly to a required specification, and an optimal wiring line pattern of the circuit substrate 602 can be arranged. Also, with a common configuration of the circuit substrate 602, it is possible to add and reduce only a necessary measuring unit or electronic component, and to realize various kinds of thermal flowmeters 300. Also, since the housing 302 is a common component, it is possible to perform production without changing an assembly line. Thus, the number of processes can be reduced and a reasonable thermal flowmeter 300 can be realized.

Third Embodiment

In the following, an embodiment describing a relationship between a sub-passage 307 of a housing 302 and an installation position of a circuit substrate 602 of a case where a shape of the circuit substrate 602 is changed will be described.

Figure 6A:
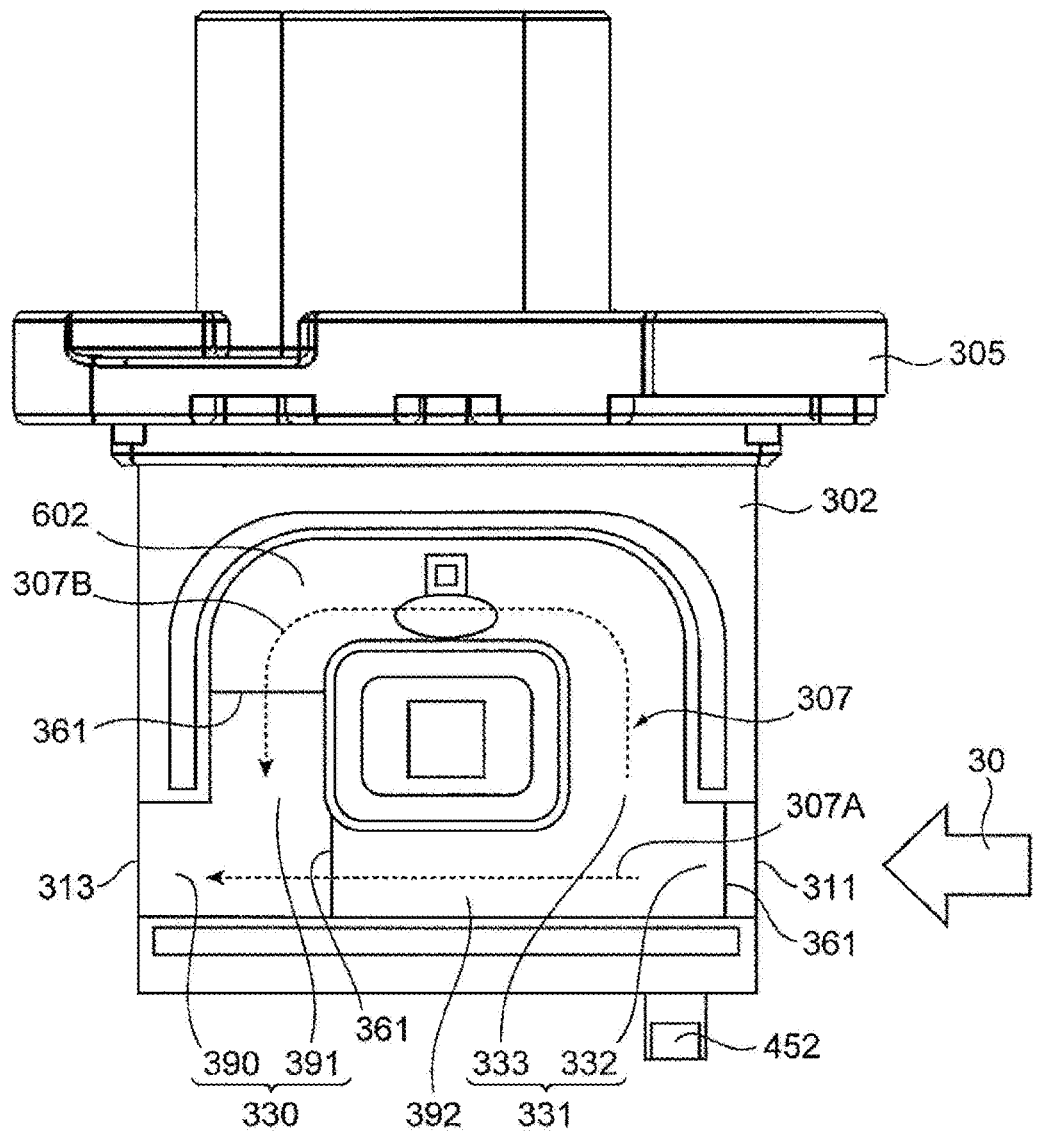
FIG. 6A is a schematic front view of a housing of a thermal flowmeter according to a third embodiment of the present invention.
Figure 6B:
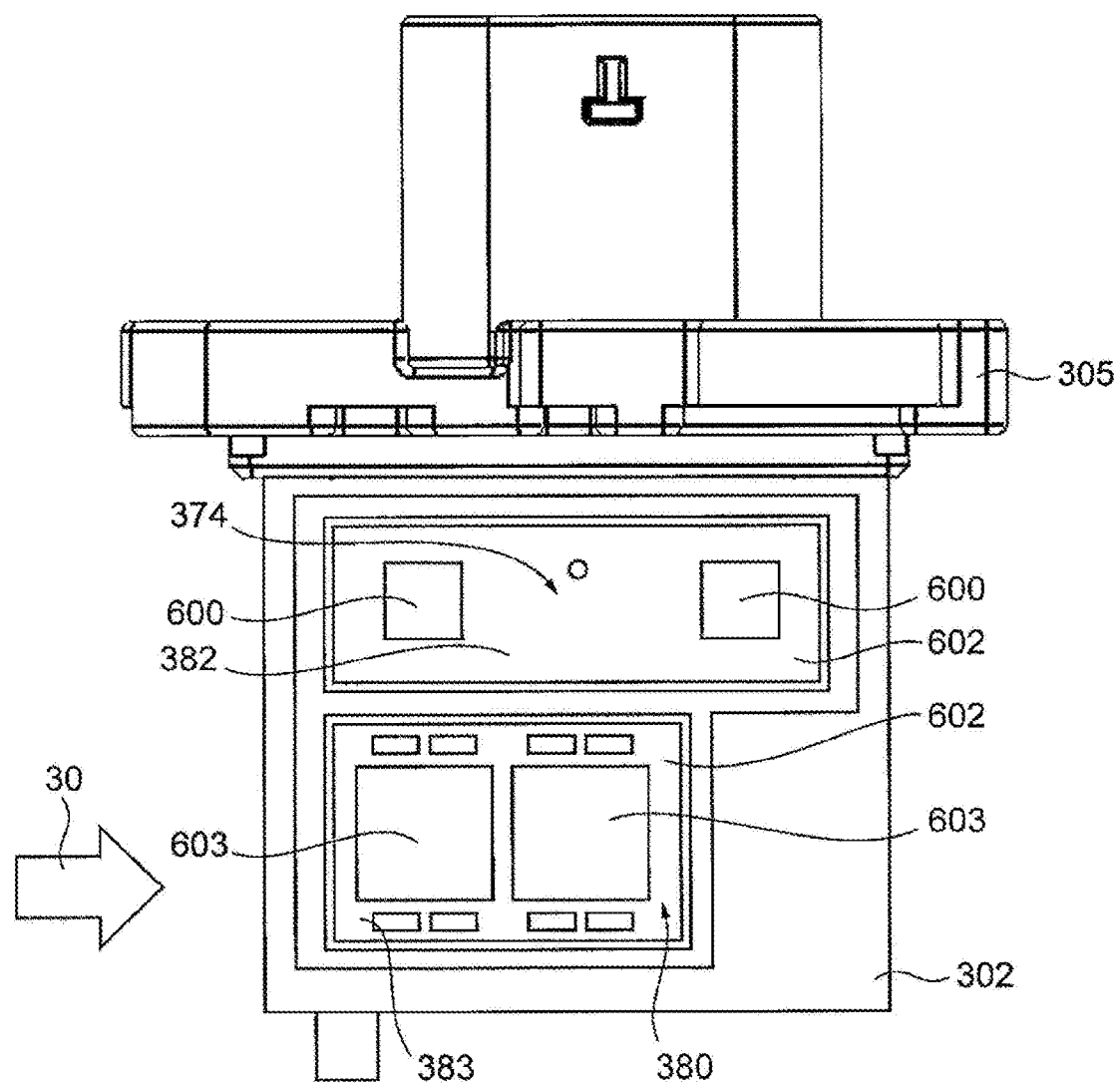
FIG. 6B is a schematic rear view of the housing of the thermal flowmeter according to the third embodiment of the present invention.
Figure 7A:
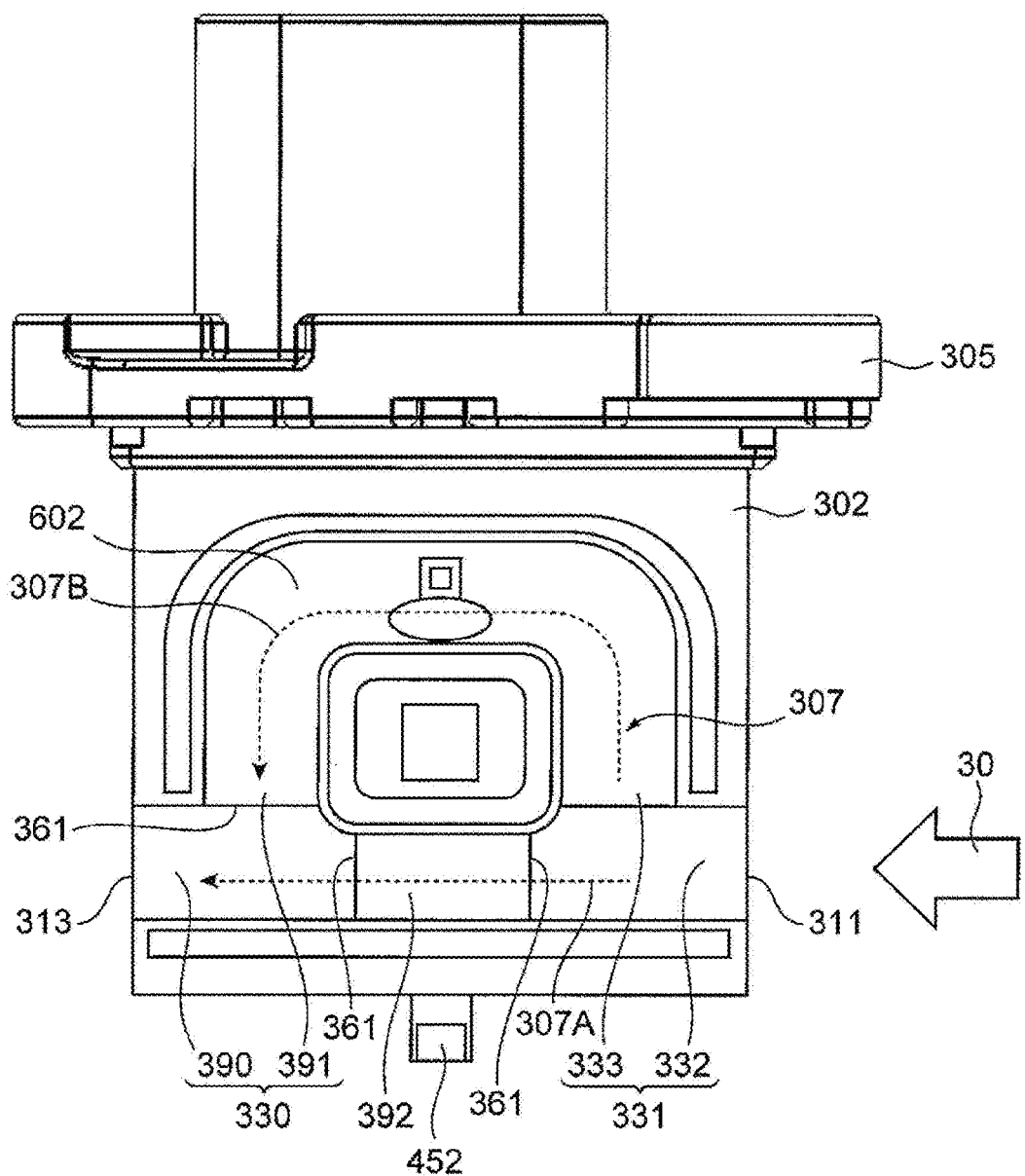
FIG. 7A is a schematic front view of a housing of a thermal flowmeter according to the third embodiment of the present invention.
Figure 7B:
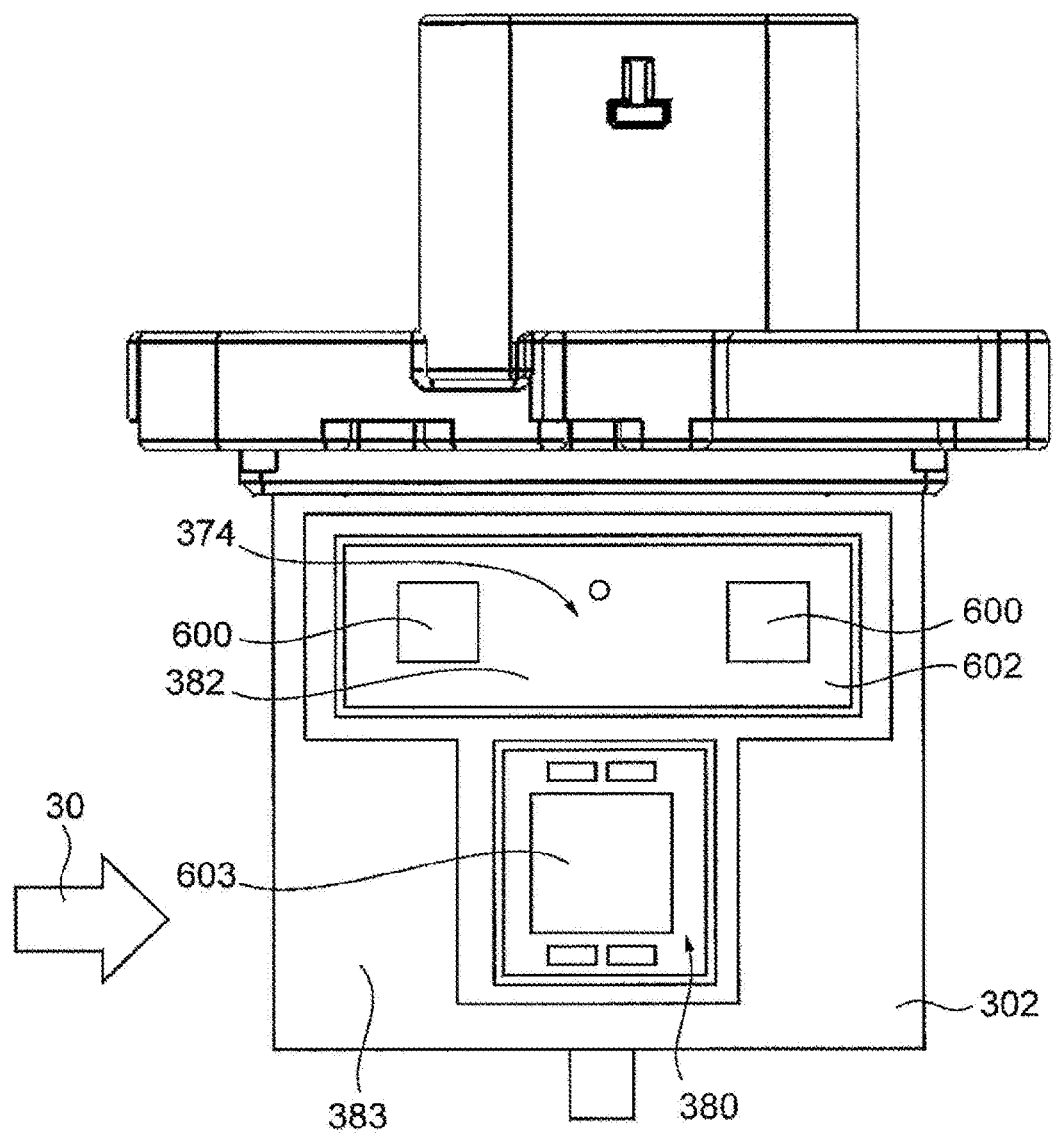
FIG. 7B is a schematic rear view of the housing of the thermal flowmeter according to the third embodiment of the present invention.

FIGS. 6A and 7A are schematic front views of a housing 302 of a thermal flowmeter 300 according to the third embodiment. FIGS. 6B and 7B are schematic rear views of the housing 302 of the thermal flowmeter 300 according to the third embodiment.

In the embodiment in FIG. 3A, a substrate end part boundary 361 of a circuit substrate 602 is arranged on the same plane in the vicinity of a linear groove part 332 included in a main passage 307A of a sub-passage 307. However, depending on a required specification, there is a case where various circuit components 603 and electronic components 608 such as a capacitor are selected to delete an unnecessary function or performance. Also, in a different specification, there is a case where a one-chip component in which a flow rate measuring unit 451, a circuit component 603, and an electronic component 608 such as a capacitor are integrated is included.

In FIG. 6A, a case where a boundary 361 of an end part of the circuit substrate 602 is installed in the vicinity of a sub-passage groove 392 included in the main passage 307A, and a case where a substrate end part boundary 361 of the circuit substrate 602 is installed in the vicinity of a sub-passage groove 333 included in a bypass passage 307B of the sub-passage 307 and in the vicinity of a sub-passage groove 391 are illustrated.

In a configuration in the manner of the present embodiment, the number of productions is increased by downsizing of the circuit substrate 602 and the number of components is reduced, whereby it is possible to realize a reasonable thermal flowmeter 300 with a lower cost.

In the above, embodiments of the present invention have been described with reference to the drawings. However, a detailed configuration is not limited to these embodiments. Even when a design change or the like within the spirit and the scope of the present invention is made, that is included in the present invention.

In the above, embodiments of the present invention have been described in detail. However, the present invention is not limited to the above embodiments and various design changes can be made within the spirit and the scope of the present invention described in claims. For example, the embodiments have been described in detail to describe the present invention in an easily understandable manner and are not necessarily limited to what includes all of the described configurations. Also, it is possible to replace a part of a configuration of a certain embodiment with a configuration of a different embodiment and to add a configuration of a different embodiment to a configuration of a certain embodiment. Moreover, with respect to a part of a configuration of each embodiment, addition, deletion, or replacement of a different configuration can be performed.

REFERENCE SIGNS LIST 30 measured gas (fluid)
124 main passage
300 thermal flowmeter
302 housing
305 flange
307 sub-passage
307A main passage
307B bypass passage
330 sub-passage groove
331 sub-passage groove
392 sub-passage groove
310 chassis
311 inlet
313 outlet
361 substrate end part boundary
370 air vent
371 air vent
373 ventilated space
374 ventilated space
451 flow rate measuring unit
380 circuit chamber
600 pressure measuring unit
601 humidity measuring unit
602 circuit substrate
603 circuit component
608 electronic component such as capacitor

The invention claimed is:

1. A thermal flowmeter used by being inserted from an attachment hole provided in a passage wall of a main passage into an inside of the main passage, comprising:
a flange to be fixed to an attachment part of the main passage;
a sub-passage that takes in a part of measured gas flowing in the main passage;
a flow rate measuring unit that measures a flow rate of the measured gas in the sub-passage;
a circuit component that controls the flow rate measuring unit; and
a circuit substrate on which the flow rate measuring unit and the circuit component are mounted,
wherein the sub-passage is formed in the circuit substrate.

2. The thermal flowmeter according to claim 1, wherein a second sub-passage on a surface side of the circuit substrate on which side the flow rate measuring unit is provided and a second space, which is different from the sub-passage, on a rear surface side of the circuit substrate are separated by the circuit substrate, and at least one physical sensor other than the flow rate measuring unit, and the circuit component are arranged in the second space.

3. The thermal flowmeter according to claim 1, wherein the flange, the flow rate measuring unit, and the circuit component are installed in this order in an insertion direction of the thermal flowmeter.

4. The thermal flowmeter according to claim 1, wherein the circuit substrate has a partially-molded resin component, and a first surface of the sub-passage is on a side on which the flow rate measuring unit is provided and the resin component forms an inner wall comprising a second surface of the sub-passage.

5. The thermal flowmeter according to claim 4, wherein the resin component forms a cover that is included in a part of the inner wall of the sub-passage by being adhered or welded.

6. The thermal flowmeter according to claim 1, further comprising a resin body having a recessed part, wherein the resin body forms a part of an inner wall of the sub-passage by being adhered or crimped to a surface on a side on which the flow rate measuring unit is provided of the circuit substrate.

7. The thermal flowmeter according to claim 1, wherein the sub-passage includes a main sub-passage connecting an inlet and an outlet, and a bypass passage that bypasses the main sub-passage, and the flow rate measuring unit is included in the bypass passage.

8. The thermal flowmeter according to claim 7, wherein the circuit substrate configures an entirety of one side wall surface among four side wall surfaces of the bypass passage.

9. The thermal flowmeter according to claim 7, wherein a third space is included between the main sub-passage and the bypass passage, and at least one physical sensor other than the flow rate measuring unit is installed in the third space.

10. The thermal flowmeter according to claim 1, wherein the flow rate measuring unit is electrically connected to the circuit component through a bonding wire, one end side thereof being connected to the flow rate measuring unit, and a seal material is provided that covers the bonding wire, the seal material being provided on a circuit component side of the flow rate measuring unit.

11. The thermal flowmeter according to claim 1, wherein the circuit component is at least one of a large scale integration (LSI) circuit and a microcomputer.

12. The thermal flowmeter according to claim 1, wherein the flow rate measuring unit and the circuit component are an integrated one-chip component.

13. The thermal flowmeter according to claim 1, wherein the circuit substrate is a printed substrate.

14. The thermal flowmeter according to claim 7, wherein a resist film or a surface treated film having a hydrophilic property or a water-repellent property is included on a surface of the circuit substrate included in a part of the bypass passage.

15. The thermal flowmeter according to claim 1, further comprising a temperature measuring unit that measures a temperature of the measured gas flowing in the main passage,
wherein the temperature measuring unit is provided in such a manner as to be protruded to a leading end side of a chassis extended toward a center of the main passage from the flange.

* * * * *